(12) United States Patent
Muramatsu et al.

(10) Patent No.: US 6,888,956 B2
(45) Date of Patent: May 3, 2005

(54) FINGERPRINT AUTHENTICATION APPARATUS

(75) Inventors: Yoshinori Muramatsu, Tokyo (JP); Naoki Kitagawa, Tokyo (JP)

(73) Assignee: NEC Electroncs Corporation (JP)

( * ) Notice: Subject to any disclaimer, the term of this patent is extended or adjusted under 35 U.S.C. 154(b) by 659 days.

(21) Appl. No.: 09/912,082

(22) Filed: Jul. 24, 2001

(65) Prior Publication Data

US 2002/0076089 A1 Jun. 20, 2002

(30) Foreign Application Priority Data

Jul. 25, 2000 (JP) ........................................ 2000-223345

(51) Int. Cl.$^7$ ................................................ G06K 9/00
(52) U.S. Cl. ........................ 382/124; 382/125; 382/127; 340/5.83
(58) Field of Search ................................ 382/124, 115, 382/116, 125, 126, 127; 356/71; 340/5.82, 5.83

(56) References Cited

U.S. PATENT DOCUMENTS

| | | | | |
|---|---|---|---|---|
| 4,785,171 A | * | 11/1988 | Dowling et al. | 250/227.28 |
| 5,177,802 A | * | 1/1993 | Fujimoto et al. | 382/124 |
| 5,737,439 A | * | 4/1998 | Lapsley et al. | 382/115 |
| 6,292,576 B1 | * | 9/2001 | Brownlee | 382/124 |
| 6,307,956 B1 | * | 10/2001 | Black | 382/124 |
| 6,337,918 B1 | * | 1/2002 | Holehan | 382/124 |

FOREIGN PATENT DOCUMENTS

| | | | |
|---|---|---|---|
| JP | 4-242486 | 8/1992 | |
| JP | 7-334649 | 12/1995 | |
| JP | 2554667 | 8/1996 | ............. G06T/7/00 |
| JP | 10-187954 | 7/1998 | ............. G06T/1/00 |
| JP | 11-235452 | 8/1999 | ............. A63F/7/02 |
| JP | 2000-116624 | 4/2000 | |

* cited by examiner

*Primary Examiner*—Bhavesh M. Mehta
*Assistant Examiner*—John Strege
(74) *Attorney, Agent, or Firm*—Michael Best & Friedrich LLP

(57) ABSTRACT

A fingerprint authentication apparatus has a combined visible/infrared light source, which illuminates a finger placed on an optical image sensor with both infrared light and visible light. The optical image sensor has a block with infrared sensitivity and a block within infrared sensitivity, and generates a fingerprint image from light scattered by the finger. The infrared sensitivity of the infrared-sensitive block of the optical image sensor is such that a clear image is obtained from a living organism, and an unclear image is obtained from a replica. If the finger is an actual living finger, the fingerprint images from both blocks are clear, but in the case of a replica, the image from the block having infrared sensitivity is clear, and the image from the block without having infrared sensitivity is unclear. A reference processing section compares the clarity of the fingerprint images from the block with infrared sensitivity and the block without having infrared sensitivity, and if there is a difference therebetween, judges that the finger was a replica. After this is done, an image processing section 14 extracts minutiae from the fingerprint image, and a comparison section compares the fingerprint data with fingerprint in a database.

5 Claims, 6 Drawing Sheets

IMAGE SENSOR WITHOUT
INFRARED SENSITIVITY

IMAGE SENSOR WITH
INFRARED SENSITIVITY

FINGERPRINT AUTHENTICATION APPARATUS

BACKGROUND OF THE INVENTION

1. Field of the Invention

The present invention relates to an optical fingerprint authentication apparatus.

2. Related Art

Because one cost of today's widespread information system including making use of computers is the risk of leakage of confidential and private information and the danger of unauthorized access to confidential areas, there is an urgent need in our information-intensive society for identification and authorization of individuals.

Approaches to this problem are, for example, the input of a personal identification number (PIN) when using a cash card in an automatic teller machine of a bank, and the mandatory reading of an authorization card and input of a password when entering a computer room. However, with cards being used for a broad spectrum of functions, the management of cards held by individuals has become troublesome.

Additionally, individuals forget their PINs or passwords, and there is a danger that these will be leaked to or read by others.

The fingerprint has long been thought of as a good alternative to PINs and passwords as a means for individual authentication. The fingerprint can be thought of as high-level identification information, and identification information which, of course, the individual is not required to memorize or recall.

In a general fingerprint comparison apparatus, when a fingerprint is input using an image sensor, a recognition section performs image processing of the fingerprint, and detects characteristic points of the fingerprint, these being known as minutiae.

The similarity of the input fingerprint with a fingerprint in a database is calculated from the minutiae.

This similarity is represented by a value known as a score, the higher being the score, the greater being the similarity of the input fingerprint with a fingerprint in the database. If the score exceeds a prescribed threshold value, the input fingerprint is judged to be the same as the fingerprint stored in the database.

In a fingerprint identification apparatus as described above, however, it is not possible to distinguish between the fingerprint of an actual living person and a replica thereof (that is, a copy of a fingerprint created in a non-living medium).

For this reason, in a case in which it is possible to obtain a precise photograph of a fingerprint of a living person, for example, there is a danger that if this were to be input in place of an actual living fingerprint, the apparatus would erroneously recognize it as an actual living fingerprint.

In the past, various proposals have been made to avoid the above-noted problem. For example, in Japanese patent No. 2554667, directed at an "individual authentication apparatus" (hereinafter referred to as prior art example 1), the apparatus has means for measuring the temperature at the location of the living body at which the authentication is to be done (specifically, a thermocouple disposed in the fingerprint reading section), means for judging whether or not the measured temperature is within a pre-established body temperature range (30° C. to 38° C.), and means for performing a comparison for authentication only in the case in which the result of the judgment was that the measured temperature was within the pre-established range.

According to this technology, it is possible to achieve an individual authentication apparatus that does not recognize a fingerprint taken, for example from a photograph or a cut-off finger, that is, from a location other than a part of the actual body of the person to be authenticated.

Furthermore, this apparatus uses a contact-type method, in which a finger is brought into contact with a fingerprint reading section and the fingerprint is read.

In the Japanese unexamined patent publication (KOKAI) No.11-235452, directed at a "Lock opening apparatus with an identification function" (hereinafter referred to as the prior art example 2), there is language describing an optical fingerprint comparison apparatus for use as a security measure for an amusement location.

This optical fingerprint comparison apparatus shines illumination onto a fingerprint part of a finger brought into contact with a prism, the reflected light therefrom being guided to an image sensor, and the fingerprint pattern being detected therefrom.

This apparatus has means for making a fingerprint comparison between priorly stored fingerprint data and the fingerprint pattern pressed up against the prism, means for performing finger recognition, and a lock-opening means for opening a lock mechanism only when there is both coincidence resulting from the comparison by the fingerprint comparison means and finger identification by the finger identification means.

The finger identification means can be body temperature, pulse, fingernails and skin, and the shape of the finger.

Additionally, in the Japanese unexamined patent publication (KOKAI) No.10-187954, directed at a "All-in-one fingerprint reading system with a heating resistor" (hereinafter referred to as prior art example 3).

In contrast to the above-described contact-type system, in which the fingerprint reading means is separated from the means for measuring the temperature of the body part, the system of the Japanese unexamined patent publication (KOKAI) No.10-18795 combines these two elements. That is, a fingerprint reading sensor, up against which the finger is pressed, has an active surface of an element that is highly responsive to changes in temperature, and a built-in heating resistor for bringing about a transient temperature change in the sensitive element.

The thermal change caused by the heating resistor results in an electrical signal that differs, depending upon the thermal conductivity between the grooves and the raised portions of the lines of a fingerprint in contact with the sensing element matrix.

Fingerprint recognition is performed based on the above, and it is possible to recognize whether or not the fingerprint is from part of an actual living person during the fingerprint reading, via the characteristic heat released from a finger.

In the above-described prior art example 1, however, a thermocouple is used to detect the temperature of the object under measurement, and because a judgment is made that the object is an actual person if the temperature is within a prescribed temperature range (30° C. to 38° C.), if a fingerprint replica is raised to within the prescribed temperature, an erroneous judgment that the object is a human body will be made, thereby not solving the problem.

In the prior art example 2, a fingerprint pattern is recognized by an image sensor 106 using a non-contact method, and a detector 101 detects body temperature, pulse, or the like. In the case of body temperature detection, in the same manner as in the prior art example 1, it is possible to defeat this apparatus by simply warming up a replica.

In the case of pulse detection, the need to have quite a sensitive sensor to measure the pulse makes this device impractical. Additionally, even if such as device were achieved, the auxiliary detector (pulse detector) would become much more expensive than the image sensor, which is the main sensor, this also making the device impractical.

In the prior art example 3, the fingerprint reading section and the body temperature detector are combined as one. However, because of the use of an element sensitive to changes in temperature as the sensor that reads the fingerprint, this system is susceptible to changes in ambient temperature, making it necessary, for example, to change the threshold value between the summer and the winter, this presenting a problem in terms of maintenance.

Accordingly, it is an object of the present invention to solve the above-noted problems encountered the prior art, by providing stable fingerprint authentication, which is little influenced by the ambient temperature.

Another object of the present invention is to provide a fingerprint authentication apparatus that is maintenance free.

SUMMARY OF THE INVENTION

To achieve the above-noted objects, the present invention adopts the following described basic technical constitution.

Specifically, a first aspect of the present invention is a fingerprint authentication apparatus having an imaging section, which images the object of fingerprint authentication using an optical image sensor having sensitivity in the infrared region, an image processing section, which performs image processing of data obtained from the imaging section, thereby obtaining a fingerprint image, and a comparison section, which performs a comparison of the thus-obtained fingerprint with a priorly stored fingerprint image.

A second aspect of the present invention is a fingerprint authentication apparatus having an imaging section which forms an image of a fingerprint to be authenticated by an optical image sensor formed by a first optical image sensor having sensitivity in the infrared region and a second optical image sensor having sensitivity in the visible light region, first and second optical image sensors being mutually neighboring, an image processing section, which processes the data obtained from the image processing section and obtains a fingerprint image therefrom, and a comparison section, which performs a comparison of the fingerprint image to be authenticated thus obtained with a priorly stored fingerprint.

More specifically, the optical image sensor of the present invention is a CCD or CMOS device, and in the optical image sensor or block with infrared sensitivity used in the present invention a deep P-well structure is formed directly beneath an N channel, and between a P substrate and an N channel, this having a lower concentration and greater depth than those of the normal P-well.

DETAILED DESCRIPTION OF THE PREFERRED EMBODIMENTS

Embodiments of a fingerprint authentication apparatus according to the present invention are described in detail below, with references made to relevant accompanying drawings.

The present invention acquires an image of an object (finger) using an optical image sensor having infrared sensitivity to sense light scattered or reflected from the object, and in doing so acquires an image (fingerprint pattern) of the object, determines the clarity thereof, and performs a judgment as to whether the pattern is living fingerprint (of a person) or a non-living fingerprint (replica).

If the result of this judgment is that the fingerprint is a living fingerprint, a comparison is made of the obtained pattern with a priorly stored image, and a judgment is made as to whether the fingerprint is that of a particular individual.

The present invention uses a CCD or a CMOS device as a two-dimensional optical image sensor having infrared sensitivity, the object having been imaged by being illuminated with infrared light and an image being obtained therefrom, a clear fingerprint image being obtained in the case of a living fingerprint, but a clear image not being obtained in the case of a replica.

The present invention is based upon these experimental results.

In the present invention, Rubber, plastic, or asbestos or the like are used as replica materials. The reason for using these materials is that the simplest method of forming a replica of a fingerprint is to first make a cast of the finger and then pour the material into the cast, which serves as a mold.

Although the reason for this phenomenon has not at this point in time been explained at the present time, its repeatability is supported by experimental results.

Various embodiments of the present invention are described below.

Figure 1:
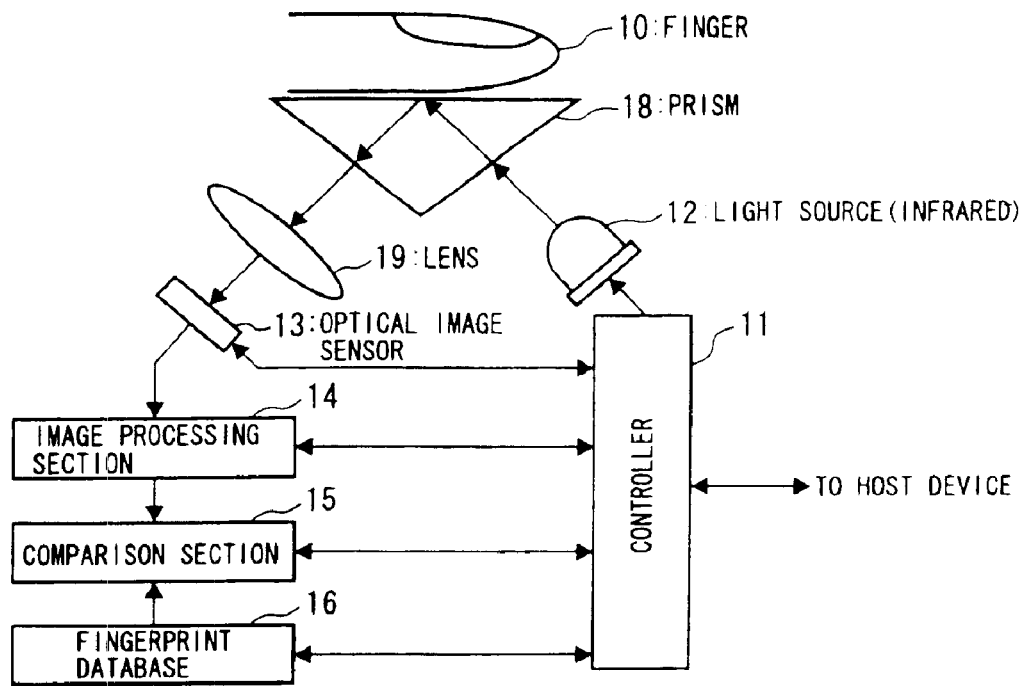
FIG. 1 is a drawing showing the configuration of a first embodiment of a fingerprint authentication apparatus according to the present invention.

FIG. 1 is a drawing showing the configuration of a first embodiment of a fingerprint authentication apparatus according to the present invention.

This embodiment is an optical fingerprint authentication apparatus having a prism 18 and a lens 19.

A feature of this embodiment is the use of an infrared light source 12 and an optical image sensor 13 having infrared sensitivity.

It is worthy to note that the above-noted effect is achieved without the use in addition to the optical image sensor 13 of a means for identifying a living organism, such as a means for detecting body temperature.

This is possible because this means is integratedly built into the infrared light source 12 and the optical image sensor 13.

The optical image sensor 13 with infrared sensitivity will be explained hereunder.

Note that it has characteristic in that it responds to infrared light, producing a clear image in the case of a living organism and an non-clear image in the case of a replica.

Figure 7:
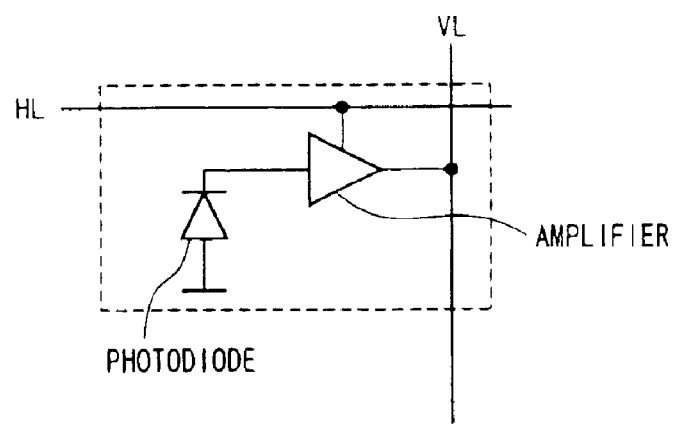
FIG. 7 is a circuit diagram showing an element of a general optical image sensor.

In general, as is widely known, an optical image sensor is formed by a multitude of elements, each formed by a photodiode and an associated amplifier and being arranged in a matrixed configuration, as shown in FIG. 7.

More specifically, when light from the light source strikes a photodiode, the photodiode generates an electrical current proportional to the incident light. This electrical current is amplified by the amplifier and extracted, resulting in an electrical signal corresponding to the light. To form a matrix of elements configured in this manner, the activated terminals of the amplifiers are connected to the horizontal lines HL of the matrix, and the outputs of the amplifiers are connected to the vertical lines VL of the matrix.

Figure 6:
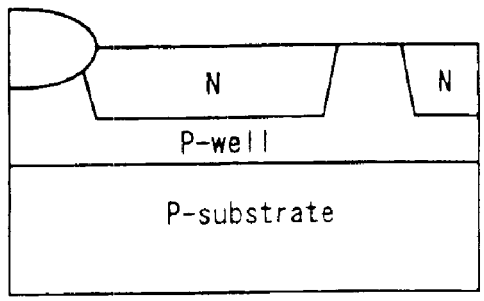
FIG. 6 is a cross-sectional view showing the structure of image sensors, (A) showing the structure of an image sensor having no infrared sensitivity, and (B) showing the structure of an image sensor having infrared sensitivity.
Figure 6:
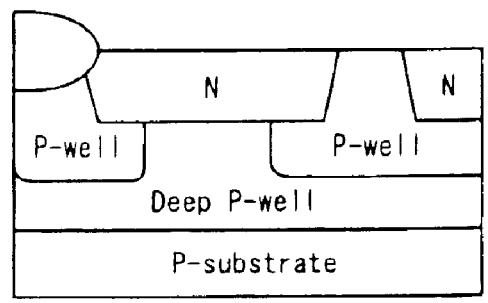

FIG. 6 is a cross-sectional view showing the semiconductor device structure in elements of image sensors, FIG. 6(A) showing the structure in an element of an optical image sensor without having infrared sensitivity and FIG. 6(B) showing the structure in the optical image sensor 13 having infrared sensitivity.

In an optical image sensor without having infrared sensitivity which forming the photodiode between the P-substrate and N-channel N, there is merely a shallow P-well layer, as shown in FIG. 6(A), In contrast to the above, in the optical image sensor 13 with having infrared sensitivity forming the photodiode, as shown in FIG. 6(B), between the P-substrate and the N-channel N, there is a deep P-well.

This deep P-well has a lower concentration than that of a usual P-well, and is formed as a deeper layer than that thereof, this being formed directly below the N-channel.

As a result, the usual P-well is formed only over the deep P-well on both sides, and directly below the N-channel layer.

Because infrared light generates an electrical charge at a deeper location in a semiconductor device than visible light, it is possible using a deep P-well structure to augment the electrical charge generated at a deep location.

Therefore, an optical image sensor 13 having a deep P-well structure has sensitivity in the infrared region. In the above description, the example is that of a CCD image sensor.

A person skilled in the art, however, will understand that this applies as well to a CMOS optical image sensor.

The operation of the first embodiment is described below, with reference made to the flowchart of FIG. 8.

When performing fingerprint authentication, in response to an instruction from a host device (not shown in the drawing), a controller 11 irradiates the infrared light from the infrared light source 12 to the prism 18.

When this is done, the object being authenticated (finger 10 of a living human, in the normal case) is placed over the prism 18.

Infrared light incident to the prism 18 is reflected at the surface at which the finger 10 makes contact with the surface of the prism 18, collected by the lens 19, and input to the optical image sensor 13. The optical image sensor 13 converts the infrared light incident thereto to an electrical signal, which is input to the image processing section 14.

Figure 8:
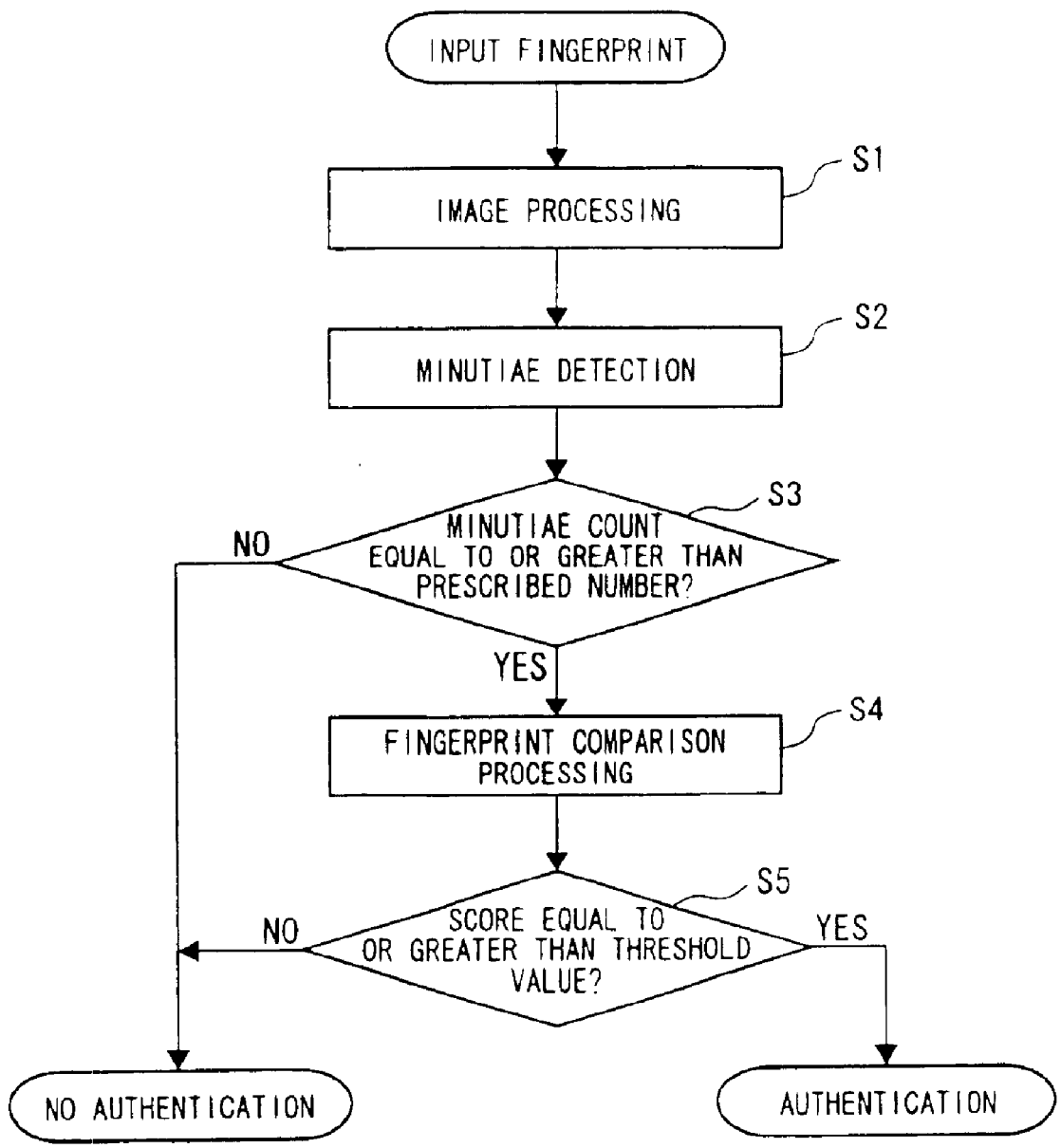
FIG. 8 is a flowchart illustrating the first and second embodiments of a fingerprint authentication apparatus according to the present invention.

The image processing section 14 performs image processing of the current input from the optical image sensor 13, under the control of the controller 11 (step S1 in FIG. 8).

When this is done, by virtue of the above-described infrared characteristics, from the light reflected by the "finger" a clear image of the finger print is obtained in the case of an actual living finger, but a non-clear image thereof is obtained in the case of a replica of a finger.

The image processing section 14 detects minutiae from the thus obtained image (step S2 in FIG. 8), and performs a judgment as to whether or not the number thereof is equal to or greater than a prescribed number (FIG. S3 in FIG. 8).

If the result is that the number of minutiae is less than the prescribed amount, authentication is not possible.

If, however, the minutiae count is equal to or greater than the prescribed number, the comparison section 15 performs a fingerprint comparison (step S4 in FIG. 8).

In performing this fingerprint comparison, a comparison is made between image data of the input fingerprint and image data of a fingerprint priorly stored in the database 16 and a similarity therebetween is calculated from the minutiae, this similarity being expressed as a value known as the score.

A judgment is made as to whether or not the score is equal to or greater than a threshold value (step S5 in FIG. 8).

If the result of this judgment is that the score is equal to or greater than the threshold value, a judgment is made that the fingerprint is that of an authorized person, while, if the result of this judgment is that the score is less than the threshold value, a judgment is made that the fingerprint is not that of an authorized person.

Because this embodiment can be easily achieved by replacing the visible light source of a fingerprint authentication apparatus of the past with an infrared light source, and replacing the optical image sensor of a fingerprint authentication apparatus of the past with an optical image sensor having infrared sensitivity, it is possible to achieve this embodiment as a modification of an existing apparatus.

Figure 2:
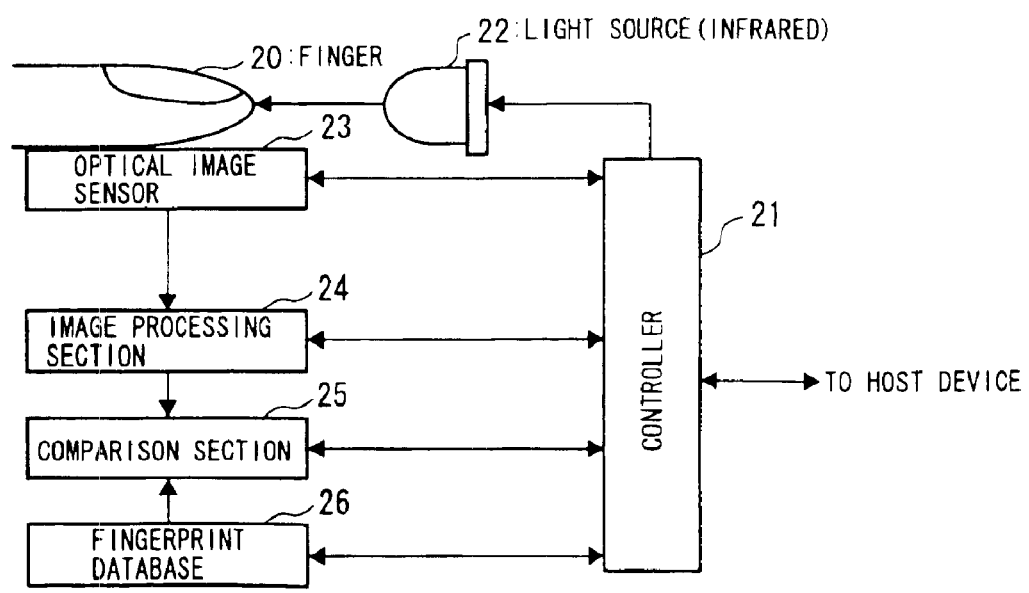
FIG. 2 is a drawing showing the configuration of a second embodiment of a fingerprint authentication apparatus according to the present invention.

FIG. 2 is a drawing showing the configuration of a second embodiment of a fingerprint authentication apparatus according to the present invention. In this fingerprint authentication apparatus, rather than using a prism and lens or such optical components, and in contrast to an optical fingerprint authentication apparatus in which a finger is brought into direct contact with an optical image sensor, an infrared light source 22 and an optical image sensor 23 having the infrared sensitivity are used, similar to the case of the first embodiment.

Specifically, in this apparatus, the finger is directly illuminated, the scattered light therefrom being received by a two-dimensional image sensor formed by a multitude of light-receiving elements arranged in a two-dimensional pattern.

When a fingerprint is input, the fingerprint is brought into proximal contact with a light-receiving surface of the light receiving elements.

The light-receiving elements having light-receiving surfaces being in proximal contact with raised parts of the fingerprint, detects a bright region to which the scattered light from inside the finger tip, can be reached in a good condition through the raised parts of the fingerprint, as raised parts of the fingerprint.

In contrast to this, light-receiving elements having light-receiving surfaces in proximal contact with valley parts of the fingerprint, detects non-bright region to which the scattered light from inside the finger tip cannot be reached, as valley parts of the fingerprint.

In FIG. 2, the infrared light source 22 and the optical image sensor 23 are configured as described above.

When a fingerprint comparison is being done, the finger 20 is brought into direct contact with the optical image sensor 23.

Infrared light illumination from the infrared light source 22 is scattered by the finger 20, this scattered light being received by the optical image sensor 23.

Subsequent processing is the same as the processing in the case of the first embodiment, and the flowchart of FIG. 8 applies in this case as well.

In FIG. 2 and FIG. 1, the lower-order digit of the reference numerals being the same indicates that these are corresponding elements of the two embodiments.

Figure 3:
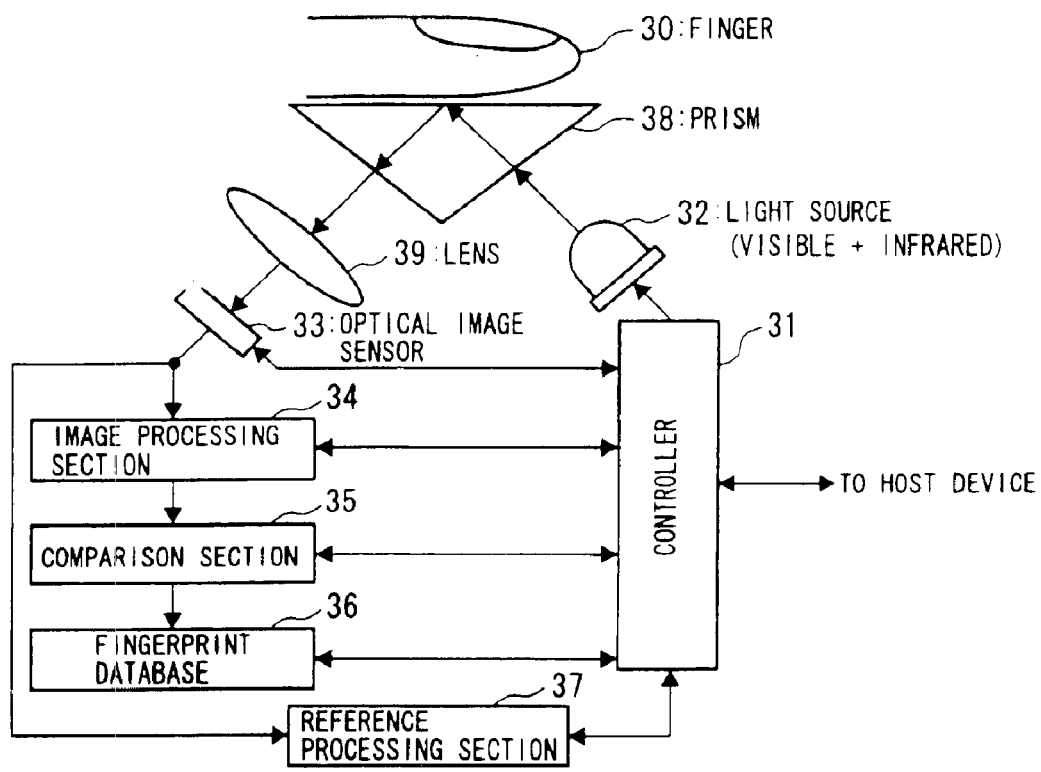
FIG. 3 is a drawing showing the configuration of a third embodiment of a fingerprint authentication apparatus according to the present invention.

FIG. 3 is a drawing showing the configuration of a fingerprint authentication apparatus according to the third embodiment.

In this embodiment, which is a fingerprint authentication apparatus using a prism 38 and a lens 39, the use of an optical image sensor 33 having infrared sensitivity is in common with the first embodiment shown in FIG. 1.

However, this embodiment uses a combined visible/infrared light source 32, in which visible light is mixed with infrared light is used, and consideration is given to the optical image sensor 33, an accompanying reference processing section 37 is further provided.

The optical image sensor 33 is formed by a block having infrared sensitivity and a block without having infrared sensitivity.

Each one of the former and the latter forms the semiconductor device configurations as shown in FIG. 6(B) and FIG. 6(A), respectively.

In the case in which the optical image sensor 33 is implemented on a single chip, with this separation into blocks, both blocks reside on one and the same chip.

Alternately, it is possible to implement the optical image sensor 33 with a chip having infrared sensitivity and a chip without having infrared sensitivity, this method resulting in an improved chip yield.

Additionally, an alternative simplified method is that of partially affixing a infrared-cutting filter to an optical image sensor having infrared sensitivity, thereby forming a block that does not have infrared sensitivity in the portion having the infrared-cutting filter.

Figure 5:
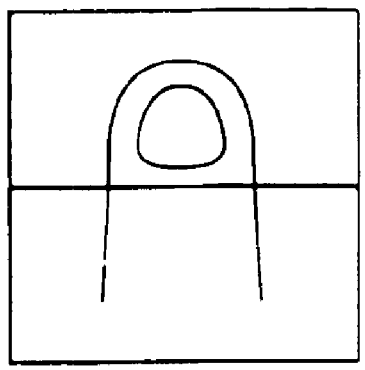
FIG. 5 is a schematic representation illustrating judgment of a living fingerprint and a replica using an optical image sensor in the third and fourth embodiments of the present invention.
Figure 5:
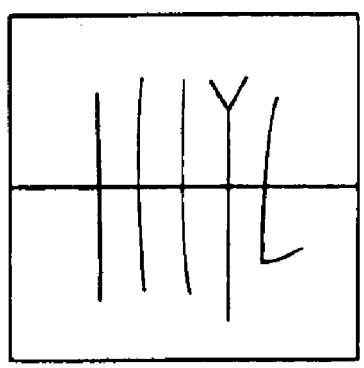
Figure 5:
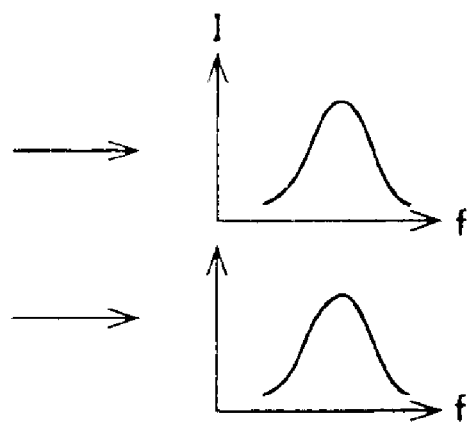
Figure 5:
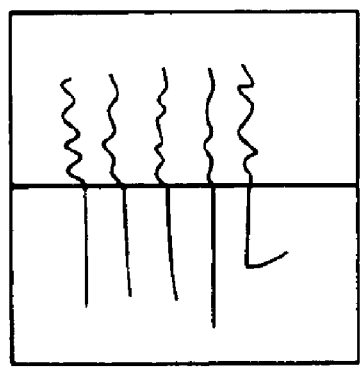
Figure 5:
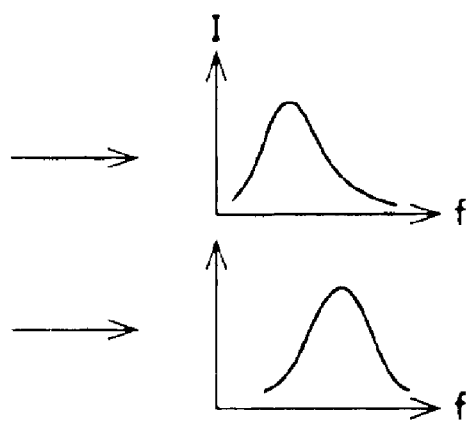

FIG. 5 is a drawing illustrating the discrimination between a living organism and a replica in the optical image sensor 33, the upper part of which shows the block having infrared sensitivity, and the lower part of which shows the block without having infrared sensitivity.

As shown in FIG. 5(A), in the case in which a finger to fingerprint authenticated is placed on the optical image sensor 33, if the finger is an actual living finger, because the image obtained from the optical image sensor 33, as shown in FIG. 5(B), because of the infrared sensitivity as shown in the upper part of the drawing, is a clear fingerprint image, and although the bottom part does not have infrared sensitivity, the visible light sensitivity in this region results in a clear fingerprint image.

In the case in which the "finger" was in fact a replica, the image obtained from the optical image sensor 33, as shown in FIG. 5(C), because of the infrared sensitivity in the upper part of the optical image sensor 33, is an unclear fingerprint image, and although there is no infrared sensitivity in the lower part, a clear fingerprint image results.

The reference processing section 37 makes a comparison between the clarity of the input fingerprint images between the block with infrared sensitivity and the block without having infrared sensitivity.

As is clear from FIG. 5, in the case of the finger of a living organism, there is no difference in clarity between the images obtained by the two blocks, but in the case of a replica, there is a difference in the clarity between the images obtained by the two blocks. Using this, it is possible to distinguish between a living finger and a replica.

Although for simplicity of description in FIG. 5 the example shown is that in which the optical image sensor 33 is divided into two blocks, it is also possible to divide this optical image sensor 33 into a greater number of blocks, in which case, the blocks having infrared sensitivity and the blocks not having infrared sensitivity can be disposed in a checkerboard pattern.

The finer is the separation into blocks, the closer is the part of the fingerprint image to be compared by the reference processing section 37, thereby enabling a more precise comparison.

The ideal arrangement is one in which a block with infrared sensitivity and a block without having infrared sensitivity are disposed for each line of the optical image sensor 33. Additionally, division into blocks is possible not only in the horizontal direction, as shown in FIG. 5, but also in the vertical direction.

Figure 9:
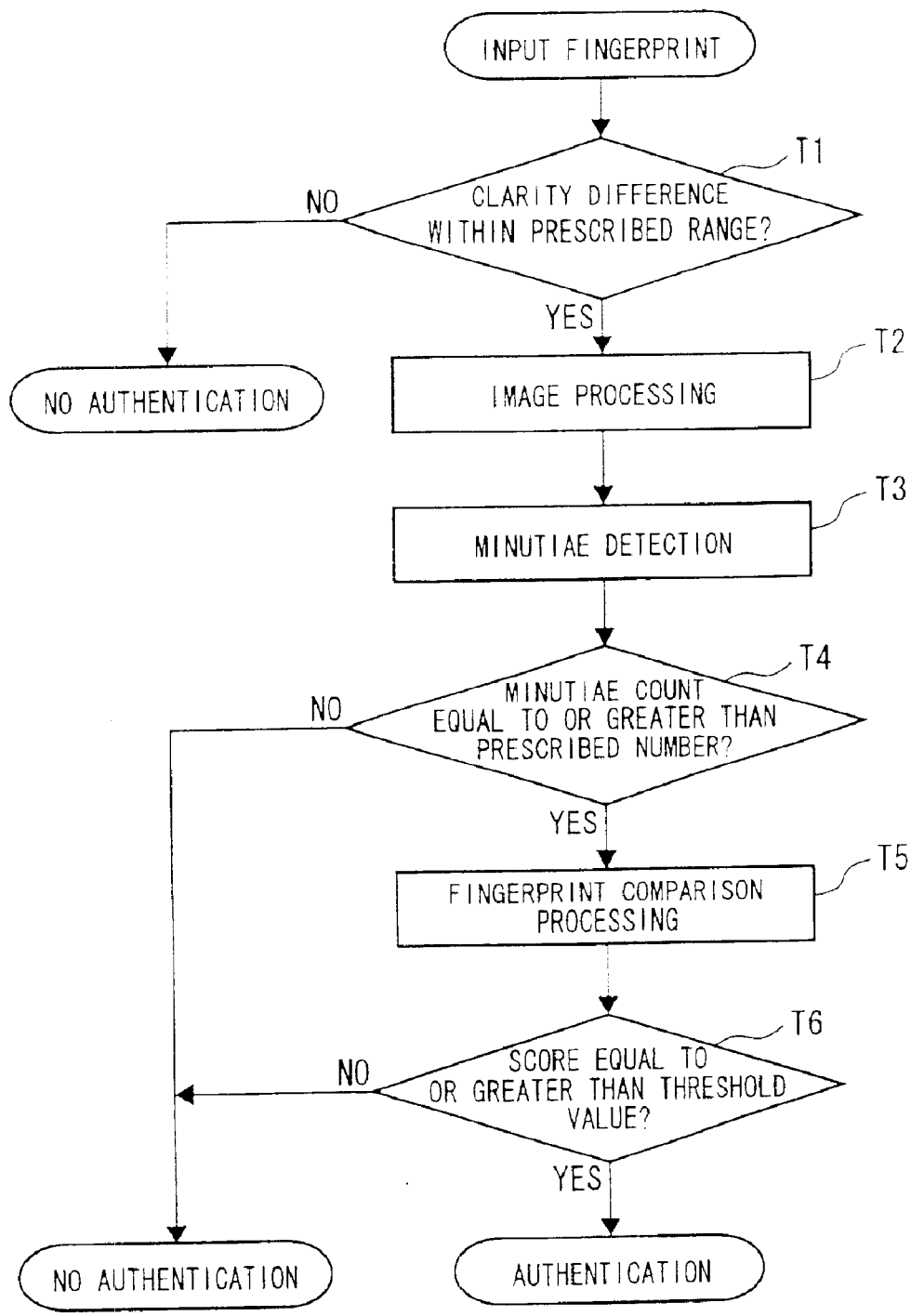
FIG. 9 is a flowchart illustrating the third and fourth embodiments of a fingerprint authentication apparatus according to the present invention.

FIG. 9 is a processing flowchart of processing performed in the second embodiment, in which a "Clarity difference within prescribed range?" step T1 is inserted before the step S1 of FIG. 8. If the result of the check performed at step T1 is affirmative, the processing of steps T2 and thereafter is performed. In FIG. 9, steps T2 through T6 correspond to steps S1 to S5 of FIG. 8.

The following methods can be envisioned as a specific method of image comparison between the blocks in the reference processing section 37, such a method being performed by, for example, a DSP (digital signal processor) within the reference processing section 37.

The first method is that of performing a Fourier transform of the clarity of each of the blocks with regard to the input fingerprint image.

In the Fourier transform in this case, the transition density of the bright parts and the dark parts of the fingerprint image is converted to spatial frequency, the parts having a high transition density having a high spatial frequency, and the parts having a low transition density having a low spatial frequency.

In the case of a living organism fingerprint, because clear images are obtained from both the block with infrared sensitivity and the block without having infrared sensitivity, as shown in FIG. 5(B), the spatial frequency for both blocks is high, and there is no different between the spatial frequencies.

In the case of a replica, however, as shown in FIG. 5(C), because the block having infrared sensitivity yields an unclear image, its corresponding spatial frequency is low, and because image yielded from the block without having infrared sensitivity is clear, its corresponding spatial frequency is high, so that there is a difference between the spatial frequencies, this difference enabling elimination of the replica.

A second specific method of image comparison is that in which the standard deviation of the clarity from each of the blocks with regard to the input fingerprint image is calculated. In the case of imaging a replica, because the image from the block having infrared sensitivity is unclear, the standard deviation of this clarity is smaller than that of the clarity of the image from the block without having infrared sensitivity.

In the case of a fingerprint from a living organism, there is no difference between the standard deviation of the blocks.

In the case of a replica, however, the standard deviation for the block with infrared sensitivity is low compared with the standard deviation for the block without having infrared sensitivity, this fact being used to eliminate a replica.

A difference in the absolute values of the sensitivity between the block with infrared sensitivity and the block without having infrared sensitivity occurs. Because of this, a controller 31 sets the shutter speed for each of the blocks independently, so as to obtain proper images.

The above-noted shutter speed is the time in a PN junction of the optical image sensor 33 from the application of a reset to the N-channel layer, which starts the reading of the current signal, until the completion of readout, the shutter speed of a block having a high infrared sensitivity being set so as to be faster than the shutter speed of a block without having infrared sensitivity. As a result, the exposure time of a block with high infrared sensitivity is shorter than that of a block without having infrared sensitivity, thereby compensating for the difference in sensitivity, and achieving an overall image having the same brightness for both blocks.

The controller 31 can achieve the same effect by appropriate sensor sensitivity settings independently for each block. Specifically, the current amplification factor of an amplifier in the optical image sensor 33 with respect to a block having infrared sensitivity is set lower than that of an amplifier for a block without having infrared sensitivity.

Additionally, in the case in which it is difficult for the controller 31 to simultaneously set different shutter speeds for two blocks, as noted above, it is alternatively possible for the controller 31 to detect an appropriate shutter speed for each of the blocks and, after imaging at each of the shutter speeds with a time shift therebetween, to synthesize an image from the images of the individual blocks. This can also be applied in a case in which the amplification factors for the two blocks are set differently.

Figure 4:
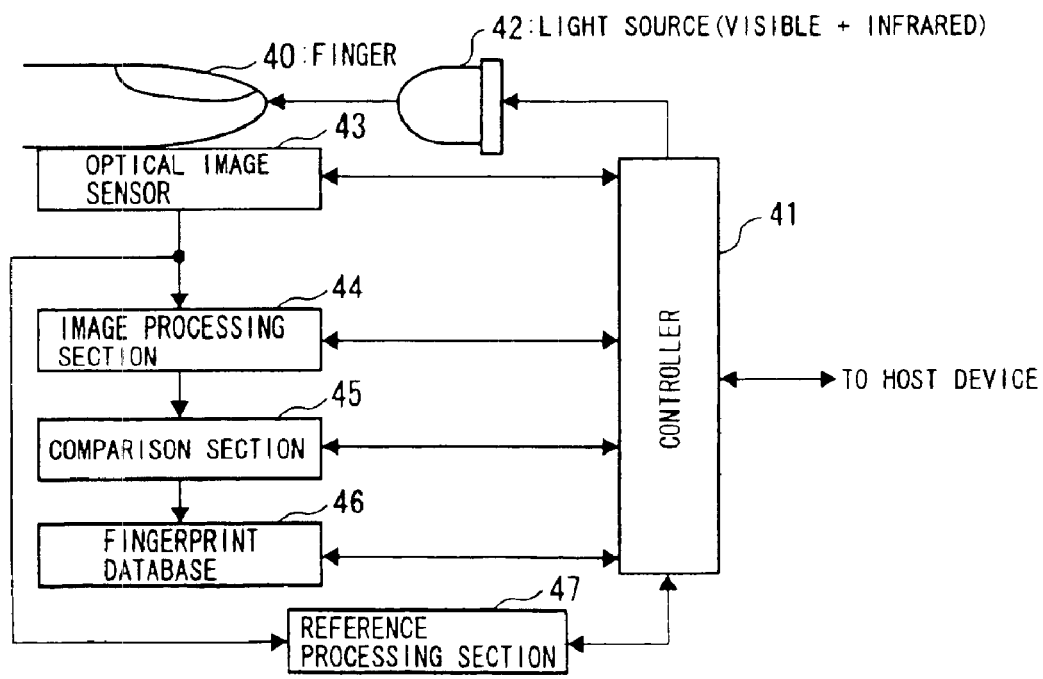
FIG. 4 is a drawing showing the configuration of a fourth embodiment of a fingerprint authentication apparatus according to the present invention.

FIG. 4 is a drawing showing the configuration of an optical fingerprint authentication apparatus according to the fourth embodiment of the present invention. In this embodiment, rather than using a prism and lens or such optical components, the finger is brought into direct contact with an optical image sensor, the relationship between this fourth embodiment and the third embodiment being the same as the relationship between the second embodiment and the first embodiment.

Specifically, in this fingerprint authentication apparatus, a combined infrared/visible light source 42 providing illumination with mixed infrared light and visible light being used and consideration being given to the optical image sensor 43, an accompanying reference processing section 47 being further provided.

The optical image sensor optical image sensor 43 is formed by a block having infrared sensitivity and a block without having infrared sensitivity. A reference processing section 47 performs a comparison of the clarity of the fingerprint images input between the block with infrared sensitivity and the block without having infrared sensitivity within the optical image sensor 43.

Infrared light illumination from the visible/infrared infrared light source 42 is scattered by a finger is scattered by a finger 40, and received by the optical image sensor 43. Subsequent processing is the same as described with regard to the third embodiment, and the flowchart of FIG. 9 applies in this case as well. In FIG. 4 and FIG. 3, the lower-order digit of the reference numerals being the same indicates that these are corresponding elements of the two embodiments.

By adopting the technical constitutions described in detail above, the present invention achieves a number of effects. The first effect is that of, without using the piezoelectric effect and/or pyroelectric effect as in the past to read a fingerprint image, reading the image with an optical image sensor having infrared sensitivity, resulting in a stable fingerprint authentication apparatus that is little affected by the ambient temperature.

The second effect achieved by the present invention is made possible by performing stable fingerprint authentication with little influence from the ambient temperature, thereby reducing the maintenance burden in a fingerprint authentication apparatus according to the present invention.

What is claimed is:

1. A fingerprint authentication apparatus comprising:

an imaging section comprising a first optical image sensor having infrared sensitivity and a second optical image sensor having sensitivity in the visible light region, said first and second optical image sensors being mutually neighboring whereby obtaining an image of an object to be fingerprint authenticated;

an image processing section, which performs image processing of data obtained from said imaging section so as to obtain the fingerprint image; and a fingerprint comparison section, which performs a comparison between said fingerprint image and a priorly stored fingerprint image;

wherein a fingerprint image is obtained with said object not in contact with said imaging section.

2. A fingerprint authentication apparatus according to claim 1, wherein said first and second optical image sensors are both selected from a group consisting of a CCD image sensor and a CMOS image sensor, a P-well depth in said first optical image sensor is deeper than that of said second optical image sensor, and a concentration thereof is less than that of said second optical image sensor.

3. A fingerprint authentication apparatus according to claim 1, further comprising means for shining infrared light and visible light onto said object to be fingerprint authenticated.

4. A fingerprint authentication apparatus comprising:

an imaging section comprising a first optical image sensor having infrared sensitivity and a second optical image sensor having sensitivity in the visible light region, said first and second optical image sensors being mutually neighboring whereby obtaining an image of an object to be fingerprint authenticated;

an image processing section, which performs image processing of data obtained from said imaging section so as to obtain the fingerprint image; and a fingerprint comparison section, which performs a comparison between said fingerprint image and a priorly stored fingerprint image;

wherein said first optical image sensors is selected from a group consisting of a CCD image sensor and a CMOS image sensor each having infrared sensitivity, and wherein said second optical image sensor is formed by providing an infrared-cutting filter on said first optical image sensor.

5. A fingerprint authentication apparatus comprising:

an imaging section comprising a first optical image sensor having infrared sensitivity and a second optical image sensor having sensitivity in the visible light region, said first and second optical image sensors being mutually neighboring whereby obtaining an image of an object to be fingerprint authenticated;

an image processing section, which performs image processing of data obtained from said imaging section as to obtain the fingerprint image; and a fingerprint comparison section, which performs a comparison between said fingerprint image and a priorly stored fingerprint image;

wherein said first and second optical image sensors are both selected from a group consisting of a CCD image sensor and a CMOS image sensor, a P-well depth in said first optical image sensor is deeper than that of said second optical image sensor, and a concentration thereof is less than that of said second optical image sensor.

* * * * *